Jan. 27, 1970 H. W. SCHOLIN ET AL 3,491,993
ADJUSTABLE HYDRAULIC SHOCK ABSORBER
Filed Aug. 3, 1967 2 Sheets-Sheet 2

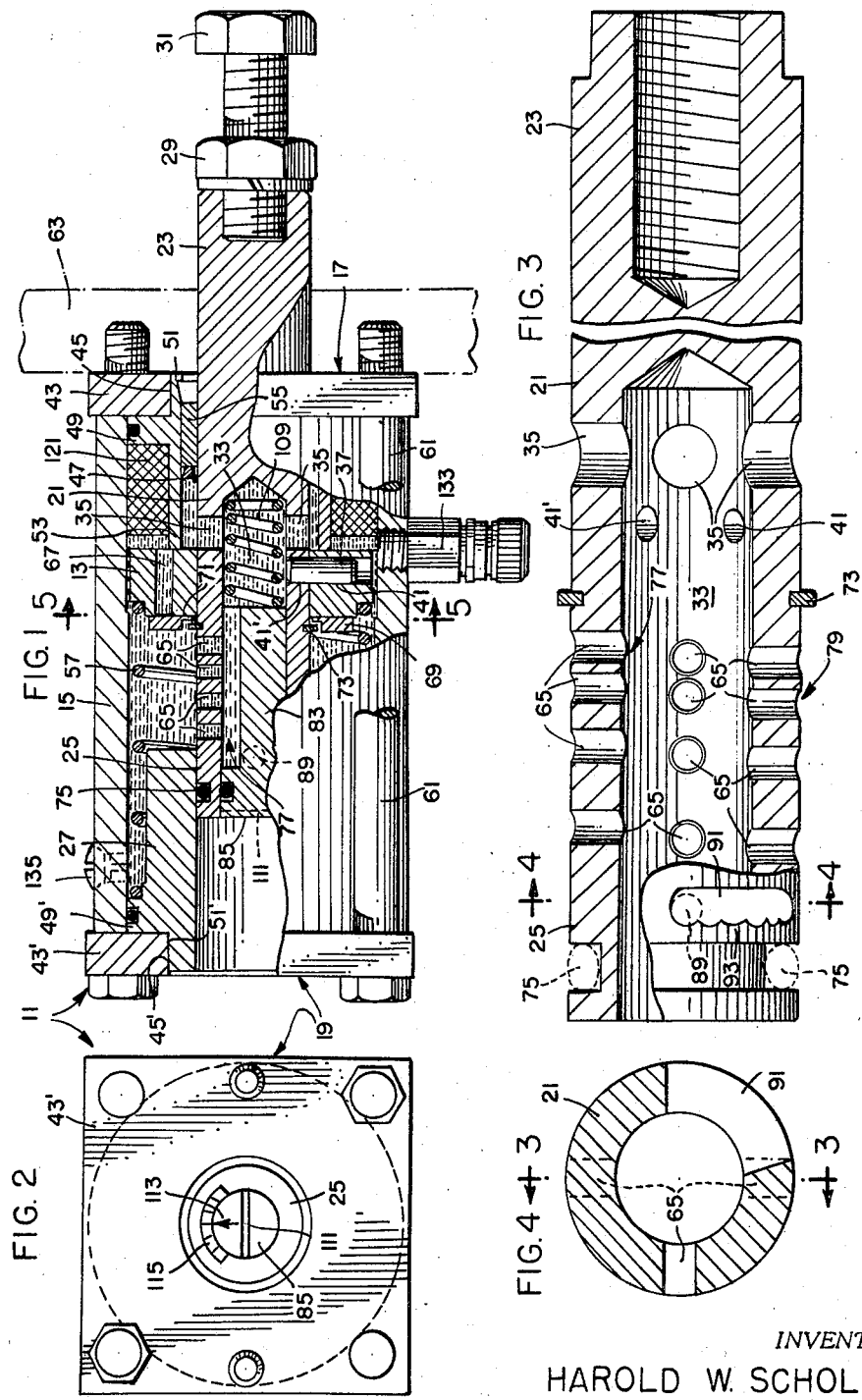

INVENTORS:
HAROLD W. SCHOLIN
HOLGER E. PEDERSEN
BY: Marzall, Johnston, Cook & Root
ATT'YS United States Patent Office 3,491,993
Patented Jan. 27, 1970

3,491,993
ADJUSTABLE HYDRAULIC SHOCK ABSORBER
Harold W. Scholin, 1225 N. Northwest Highway, Park Ridge, Ill. 60068, and Holger E. Pedersen, Chicago, Ill.; said Pedersen assignor to said Scholin
Filed Aug. 3, 1967, Ser. No. 658,221
Int. Cl. F16f 9/10, 9/32, 15/00
U.S. Cl. 267—1                                                                  16 Claims

ABSTRACT OF THE DISCLOSURE

An hydraulic deceleration device or shock absorber for buffering relatively moving parts embodying a cylinder and cooperating piston, including a hollow rod carrying the piston and formed with a plurality of longitudinally spaced, laterally opening ports, formed in the piston rod and adapted to be successively closed off, as the piston moves into the rear cylinder head, to thereby progressively reduce fluid flow through the ports, from the cylinder, into the hollow piston rod, and thereby decelerate piston movement in the cylinder, the arrangement including manually adjustable means for controlling fluid flow through the ports, to any desired extent, the same comprising a valve element adjustably turnable within the hollow piston rod, opposite the ports, to progressively close the same, by precise increments, from fully open to almost completely closed condition, to thereby regulate the buffering action of the deceleration device.

---

The present invention relates in general to apparatus for motion control, and has more particular reference to apparatus for buffering or snubbing moving objects, to decelerate and stop the movement thereof, substantially without shock or jar.

Briefly stated, apparatus embodying the present invention may comprise a cylinder and a cooperating rod-mounted piston axially movable in the cylinder, the piston rod having opposite ends extending in the cylinder and through cylinder heads, at the opposite ends of the cylinder, the piston rod being hollow and having longitudinally spaced outlet ports, in its walls, on one side of the piston, through which an hydraulic fluid, such as oil, may be expelled from the cylinder, into and through the piston rod, whereby to develop increasing resistance to piston movement, in response to successive closure of the ports, as the ported rod enters the cylinder head, the piston becoming stationary following closure of the endmost port.

An important object of the present invention is to provide an hydraulic motion control device embodying a cylinder, having closure heads at its opposite ends, and a rod-mounted piston movable axially in the cylinder, wherein the piston rod is hollow and extends on opposite sides of the piston and into the closure heads, the hollow rod being formed with axially spaced, fluid outlet ports through which hydraulic fluid, on one side of the piston, may be expelled into and through the hollow rod, as it and the piston advance axially in one direction in the cylinder, the piston rod being ducted to return fluid into the cylinder, on the opposite side of the piston, whereby piston movement in the cylinder may be progressively decelerated through successive closure of the ports, as the rod advances into a shut-off bushing formed on the rear cylinder head.

Another important object of the invention is to provide for adjusting the rate at which fluid may flow through outlet ports formed in the walls of a hollow piston rod, in order to regulate the performance of buffering apparatus of the character mentioned; a further object being to provide adjustable valve means, within the hollow piston rod and operable to progressively choke off the outlet ports to reduce fluid flow therethrough; a further object being to provide a port controlling valve, sized to fit snugly within the hollow rod, opposite the outlet ports, and having ducts therein in registration with said ports, said valve being normally positioned within the hollow rod with its ducts in alignment with the ports to provide for maximum fluid flow therethrough, means being provided for relatively shifting the port controlling valve within the hollow rod, in order to progressively reduce fluid flow therethrough.

Another important object of the invention is to provide latching means for holding the valve in any selected one of several fluid flow controlling positions of adjustment; yet another object of the invention being to normally bias the valve axially in the hollow piston rod toward latched position, the biasing means being yieldable to permit the valve to be adjustably shifted from one latched position to another.

Still another object of the invention is to provide index marking for visually indicating the adjusted position of the valve in the hollow piston rod.

Another important object is to mount the piston on the hollow rod between the opposite ends of the cylinder, with an end of the piston rod extending outwardly through the cylinder head, at the proximal or front end of the cylinder, for attachment to a relatively moving part to be buffered, a piston stop being provided at the proximal end of the cylinder for determining the retracted position of the piston, the piston rod extending rearwardly into the cylinder, in front of the piston, and being supported for axial movement in an inwardly extending bushing secured on and forming a part of the rear cylinder head, at the rear or distal end of the cylinder, said rearwardly extending portions of the piston rod having axially spaced, fluid outlet openings formed therein, between the piston and the inwardly extending end of said cut-off bushing, when the piston is in retracted position, said outlet openings becoming progressively closed, as the piston moves in the cylinder, from its retracted position to a projected position at the inner end of said cut-off bushing, whereby said bushing successively receives and closes the outlet openings, so as to afford progressively increasing resistance to fluid flow, from the cylinder, in front of the piston, and into the hollow piston rod, as the piston moves from retracted toward fully projected position, the hollow piston having fluid flow ducts therein, on the side of the piston remote from the outlet openings, through which fluid may pass into the cylinder, behind the piston, as the same advances from retracted to fully projected position.

A further object of the invention is to provide the piston with fluid flow ducts so that fluid may pass from the cylinder, behind the piston, into the cylinder, in front of the piston, as the piston is retracted, the piston having associated valve means for closing said flow channels, when the piston is moved from retracted toward projected position, said valve means serving to open said ducts during retracting movement of the piston; yet another object being to provide means for storing excess fluid in the cylinder behind the piston, said storage means preferably comprising an annular collar of compressible material extending in the cylinder behind the piston, such material being compressible to permit storage of excess fluid, and expandable to fill up space as the volume of excess fluid diminishes.

Still another important object of the invention is to provide spline means for turnably adjusting the valve within the hollow piston rod, whereby fluid flow through the ports may be varied, while the piston rod is in motion, by operation of a turnable element located preferably on the stationary cylinder head at the distal end of the cylinder; a further object being to provide for adjustment of the valve by means of a capstan turnably supported in the cylinder head, at the distal end of the cylinder.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings:

FIG. 1 is a partially sectionalized side view of a shock absorbing or motion snubbing or buffering device embodying the present invention;

FIG. 2 is a view of the device as seen from its left-hand end, in FIG. 1;

FIG. 3 is an enlarged sectional view taken longitudinally of a piston rod component of the device shown in FIG. 1;

FIG. 4 is a view of the piston rod component as seen from its left-hand end in FIG. 4;

Figure 5:
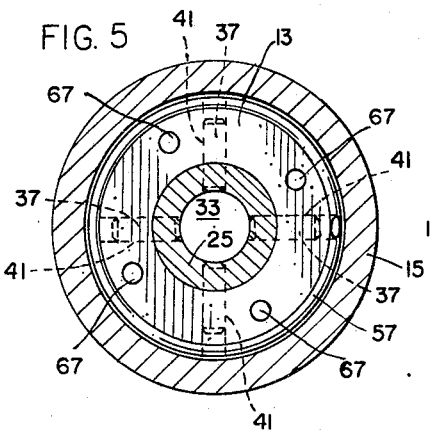
FIG. 5 is a sectional view taken substantially along the line 5—5 in FIG. 1.

To illustrate the invention, the drawings show a motion control or snubbing device 11 comprising a piston and cylinder combination 13 and 15, the cylinder having opposed ends closed by proximal and distal cylinder heads 17 and 19. The piston 13 is secured on a piston rod 21, medially of the ends thereof. One end 23 of the rod extends through and outwardly of a central opening in the proximal head 17, while the opposite end 25 of the rod extends within a support bushing 27 mounted on the distal head 19 in position extending axially within the cylinder 15.

The proximal end 23 of the piston rod may be formed, as with a lock nut 29 and a coaxial bolt 31 threaded into the end of the rod, for attachment to a movable part or object to be snubbed. The piston rod is formed with an axial bore forming a channel 33, opening at the distal end of the rod and extending towards its proximal end, beyond the mounted location of the piston 13. The channel 33 is connected with the interior of the cylinder 15, behind the piston, through radial ducts 35, formed in the rod, between its circumferential surface and the channel 33.

The piston 13, as shown more particularly in FIG. 5 of the drawings, may comprise a metal disc formed circumferentially for slip fit sliding engagement with the interior surfaces of the cylinder 15. The disc is also formed with a central opening 37 sized to snugly receive the piston rod, as a tight firm fit thereon, the piston being securely anchored on the rod in any suitable or preferred fashion, as by means of radially extending anchor pins 39 firmly press or drive fitted into preferably three or more circumferentially spaced holes 41 formed radially in the piston between its circumference and the central opening 37, and matching holes 41' formed in the piston rod.

The front head 17 may conveniently comprise a preferably square end plate 43 formed with a central opening 45, and a sleeve member 47 formed with an outstanding peripheral flange 49 spaced inwardly of an end, the flange 49 being preferably sized to fit snugly within the proximal end of the cylinder and having an outwardly opening peripheral groove for receiving a packing, such as an O-ring, in position to sealingly engage the inner surface of the cylinder 15. Accordingly, the sleeve member 47 may extend within the proximal end of the cylinder and may be secured in place therein by the end plate 43, the end 51 of the member 47, adjacent the flange 49, extending snugly in the central opening 45 of the end plate. The opposite end 53 of the member 47 may project a desired distance into the cylinder 15 to form a stop for determining the normal or retracted position of the piston and its carrying rod within the cylinder. Suitable shaft sealing means 56 may be applied within the sleeve member 47 in position surrounding the proximal end 23 of the piston rod. As shown, the sealing means comprises a preferably bronze bushing 55 mounted in the sleeve member in position to support the piston rod therein, an annular rod wiper 54 and a shaft sealing ring 56 mounted in position embracing the shaft, at the opposite ends of the bushing 55.

A preferably helical compression spring 57, sized to fit freely within the cylinder 15, is provided for normally uring the piston, in the cylinder, towards its retracted position in engagement with the inner end 53 of the sleeve member 47, the spring 57 bearing at its opposite ends respectively upon the rear face of the piston and a peripheral seat formed in the bushing 27 at the rear or distal cylinder head 19.

The distal cylinder head 19 preferably comprises the support bushing 27 and a plate 43', formed with a central opening 45', the plate 43' preferably being identical to the end plate 43. The bushing 27 may be formed with a peripheral flange 49' inwardly of a cylindrical shoulder 51', at the outer end of the bushing, the flange 49' having an outwardly opening peripheral groove for receiving a packing, such as an O-ring, in position to sealingly engage with the inner surface of the cylinder 15. The cylindrical shoulder 51' of the bushing may be sized to fit snugly into the central opening of the end plate 43' to thereby secure the bushing in coaxial alignment within the distal end of the cylinder. The end plates 43, 43' may be secured to the opposite ends of the cylinder 15 by headed fastening screws 59, which penetrate the end plates and take threadingly into the ends of the cylinder 15. These screws do not function as load carrying members, but merely serve to hold the parts together in assembled relation. Load carrying tie bolts 61 may be employed to clampingly secure the parts together and simultaneously to secure the device on any structure 63, upon which it may be desired to mount the same. The tie bolts may be sized for reception in corner openings formed in the end plates 43, 43' and may have conventional heads and threaded ends. They may be assembled with their heads seated on one end plate, with their stems extending outwardly of and alongside the walls of the cylinder 15, the threaded ends of the bolts projecting through and outwardly of the other end plate, in position to threadingly and clampingly connect with the supporting structure 63. The tie bolts 36, of course, may be applied in either direction through the end plates to fasten either end of the buffering device upon a supporting structure.

The hollow piston rod, between its distal end 25 and the piston 13 is formed with a plurality of longitudinally spaced outlet ports 65, which connect the interior of the cylinder 15, in front of the piston, with the channel 33, so that hydraulic fluid may be expelled from the cylinder space, in front of the piston, through the ports 65 and into the channel 33, as the piston is moved toward the distal end of the cylinder, from its normal or retracted position, the fluid so expelled into the channel 33 passing thence through the ducts 35, back into the cylinder, behind the piston. It will be seen that the outlet ports 65 will be successively closed off by the support bushing 27 as the distal end of the piston rod moves progressively into the bushing. Successive closure of the openings 65 will result in progressive reduction of fluid flow from the cylinder into the channel 33, thereby decelerating the movement of the piston, in the cylinder, and causing movement of the object or part, connected with the piston rod, at its proximal projecting end 23, to be buffered or snubbed. As the last of the ports 65 is closed off, by entry into the bushing 27, the piston will become stationary. Any desired number of ports may be provided, the larger the number of ports, the more uniform will be the deceleration.

The piston 13 is formed with a plurality of ducts 67 disposed outwardly of its central shaft receiving opening, said ducts opening upon the opposite front and rear faces, of the piston, to permit hydraulic fluid to flow through the ducts from the space within the cylinder, behind the piston, into the space in the cylinder, in front of the piston, as the piston is moved from its projected position, at the inner end of the bushing 27 under the influence of the spring 57, towards the retracted position of the piston in engagement with the inner end 53 of the sleeve member 47. In order to prevent fluid flow through the ducts 67 when the piston is moving from its retracted position, toward the distal end of the cylinder, a flat valve ring 69 is provided in position overlying the front face of the piston and covering the forwardly opening ends of the ducts 67, the valve ring being loosely and freely slidable with respect to the piston rod and having an inwardly extending flange 71, at the central opening of the ring, on its piston facing side, in position for cooperative engagement with a snap ring 73, seated in a snap ring groove in the piston rod, for limiting valve ring movement away from the front face of the piston. Accordingly, when the piston is moved away from its retracted position, in a direction to compress hydraulic fluid in the distal end of the cylinder, the valve ring will be pressed, by the fluid, against the front face of the piston, and will seal the ducts 67 against fluid flow therethrough, toward the proximal end of the cylinder. During movement of the piston in the opposite direction, towards its normal or retracted position, hydraulic fluid may pass freely through the ducts 67, past the valve ring and into the cylinder, in front of the piston.

The distal end of the piston rod is disposed within the inner end of the sleeve 27, when the piston and rod are in the retracted position determined by piston engagement with the inner end 53 of the sleeve member 47. The end of the piston rod, within the bushing 27 may be formed with an outwardly opening peripheral groove containing a packing material, such as a conventional O-ring in position to wipingly engage the inner surface of the bushing 27 to form a seal therewith. When the piston is in its projected position, at the inner end of the bushing 27, the distal end of the piston rod may extend adjacent the outer end of the bushing. No hydraulic fluid at any time bears upon the distal end of the rod, and the piston rod displaces no fluid, as it is pushed into the cylinder by the load being snubbed, or decelerated. The load, however, is increasingly resisted by the fluid remaining in the cylinder in front of the piston, as the outlet ports 65 are successively shut off. These outlet ports are progressively spaced more closely together, from the distal end of the rod toward the piston, in order to produce a substantially linear load decelerating force on the piston rod.

As shown in FIG. 1 of the drawings a set 77 of four ports 65 may be provided in axial alignment, on one side of the hollow rod. Any desired number of ports, however, may be formed in the rod; and the ports are preferably each longitudinally spaced, or offset with respect to axially adjacent ports. Thus, as shown in FIG. 3 of the drawings, a second set 79 of four ports may be provided in the hollow rod, diametrically opposite from the first set 77, the ports of the set 79 being axially offset, toward the distal end of the rod, with respect to the corresponding ports of the set 77.

If desired, additional sets of ports may be formed in the rod between the sets 77 and 79, the ports of each set being preferably axially offset with respect to the ports of other sets. The axial offsetting of the several sets of ports tends to make the rod decelerating effect of successive port closures more smooth and uniform. The invention, of course, is not limited to any particular pattern or arrangement of ports in the hollow piston rod, but the ports may be arranged in any preferred pattern circumferentially of the rod, the pattern shown, however, being preferred for the purpose of demonstrating the invention.

Figure 6:
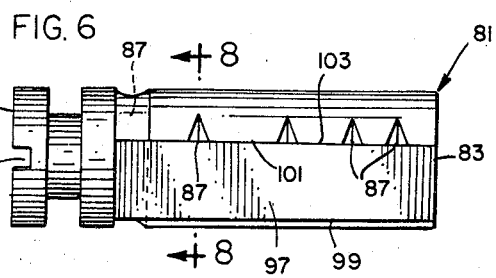
FIG. 6 is an enlarged side view of a flow-controlling valve component of the device shown in FIG. 1.
Figure 8:
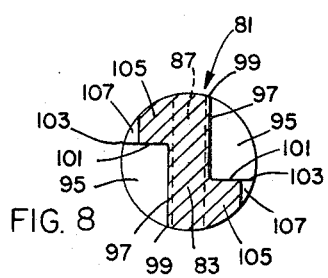
FIG. 8 is a sectional view taken substantially along the line 8—8 in FIG. 6.
Figure 7:
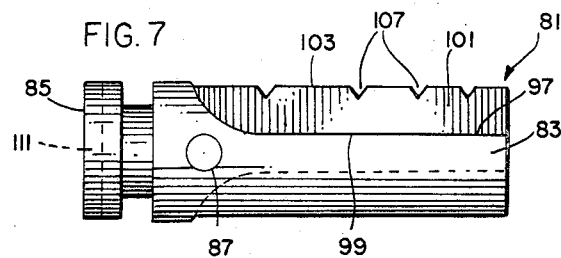
FIG. 7 is a view of the valve component as seen from the top, in FIG. 6.

Means may be provided for adjusting the buffering device for different load inntensities by closure or throttling of the orifices 65 to a desired extent, to thereby reduce the rate of fluid flow through the orifices as a proportional function of the load, the ports being adjusted for maximum flow therethrough in response to the application of light loads, the flow controlling means being adjustable to reduce flow through the openings to a minimum to accommodate loads of maximum intensity. To these ends, the present invention contemplates the provision of adjustable valve means 81, disposed within the channel 33, opposite the ports 65, and shiftable to vary the fluid flow capacity of the ports, between a maximum fully open port condition and a minimal flow conditions, wherein the ports are almost completely closed off or blocked. While any suitable or preferred adjustable means may be employed for controlling the flow of fluid through the ports 65, the valve means 81, as shown more particularly in FIGS. 6, 7 and 8 of the drawings, may comprise a valve plug 83 mounted for movement within the channel 33

As shown, the plug may comprise a generally cylindrical body mounted for turning movement within the channel 33. At one end, the body may be formed with a cylindrical head 85 sized peripherally for snug engagement within the channel 33, at the distal end of the piston rod; and the head may be formed with a peripheral groove for receiving packing material, such as an O-ring, for sealing engagement with the walls of the channel 33. Immediately inwardly of the head 85, the plug may be formed with a diametral bore or channel 87, sized to press fittingly receive a pin 89 having an end projecting radially outwardly of the head, on one side of the plug. The projecting end of the pin may extend in a pin receiving slot 91, formed in the hollow piston rod, between the groove 75 and the endmost port 65 nearest the groove. The pin slot 91 may subtend a substantial angle of the order of 75°, as shown in FIG. 4, to permit the plug 81 to be turned in the hollow piston rod, between limits determined by engagement of the outstanding end of the pin 89 with the opposite ends of the slot 91. The side of the slot 91, which faces away from the distal end of the piston rod and towards its proximal end, is preferably serrated, as at 93, to engage and hold the pin and plug 81, in any one of a number of angularly adjusted positions, between the opposite ends of the slot. On opposite sides of the pin hole 87, the plug may be cut away to provide preferably V shaped notches or grooves 95, one on each of the opposite sides of the plug, the grooves having sides 97 preferably extending in spaced parallel planes, respectively intersecting the circumference of the plug to form edges 99 on opposite sides of the plug, said groove sides 97 extending inwardly of the edges 99 each to a groove side 101 which extends at right angles from and with respect to the side 97. The groove sides 101 respectively extend oppositely in the plug and intersect the circumference of the plug to form edges 103, thereby defining cylindrical port closing valve lands 105 between the groove sides 97 and 101. Where the piston rod is formed with only one set of openings 65, the plug need be formed with but one groove 95, two grooves being provided where the piston rod has two sets of ports; and an additional groove may be provided in the plug for each additional set of ports to be controlled.

When the plug is in turned position within the hollow piston rod presenting a groove 95 in open communication with a corresponding set of ports, the ports will be entirely open and unrestricted, permitting unrestricted fluid flow, through the groove 95 and thence into the channel 33, through the open end of the groove, at the head-remote end of the plug. The plug, however, may be turned within the hollow piston rod, in a direction to move the edge 103, of the flow control land 105, transversely across the inner ends of the ports 65, thereby progressively closing the same against fluid flow therethrough into the groove 95, the leading edge 103 of the land 105 serving to close off the ports, progressively, as the plug is turned.

In order to obtain more gradual port throttling action, the leading edge 103 of a flow control portion may be provided with throttling grooves 107, each in alignment with a corresponding one of the ports 65 to be controlled, the notches 107 being of triangular cross-sectional configuration and having width of the order of or somewhat less than the diameter of the ports, at the leading edge 103 of the flow control land 105 in which formed, the triangular area of the notches decreasing progressively away from the leading edge of the land. As a consequence, substantially maximum unimpeded fluid flow may occur through the ports as the leading edge of the cut-off portion is moved into the ports, flow being progressively reduced as the triangular flow controlling notches 107 pass across the ports.

The valve means 81 should be arranged so that the ports are never completely shut off by the valve means 81, even when the plug 83 is shifted to a minimum flow position. If the ports were to be completely blocked by the valve means, the piston and its rod would be prevented from moving in the cylinder, when loaded, under any conditions. Accordingly, the assembly is arranged so that, at the limit of port closing movement of the pin 89, in the slot 91, the valve means 81 will not completely close off the ports 65.

In order to maintain the plug 83 latched in adjusted position, a preferably helical latching spring 109 may be provided within the channel 33, with the opposite ends of the spring bearing respectively on the piston rod, at the inner end of the channel 33, and upon the inner end of the valve plug 83, remote from the head 85, thereby urging the plug, in the channel 33, towards the distal end of the piston rod, and holding the projecting end of the pin 89 yieldingly against the serrated pin latching side 93 of the slot 91. The flow adjusting plug valve 83 may be turnably adjusted to a desired setting, in the hollow piston rod, by means of a plug turning tool applied, through the central opening of the rear end plate 43′, into turning engagement with the exposed end of the head 85, which may be provided with a diametral slot 111, or other convenient tool engaging formation. If desired, cooperating index and gauge marks 113 and 115 may be formed, on the outwardly facing end if the plug head 85 and on the surrounding end of the piston rod, in position visible through the central opening in the end plate 43′, to indicate the adjusted position of the port throttling valve means 81.

Figure 10:
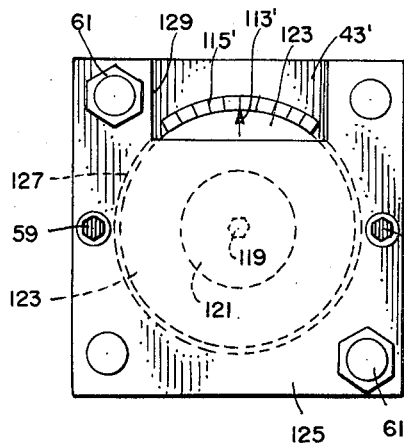
FIG. 10 is a view of the device as seen from its left-hand end, in FIG. 9.
Figure 9:
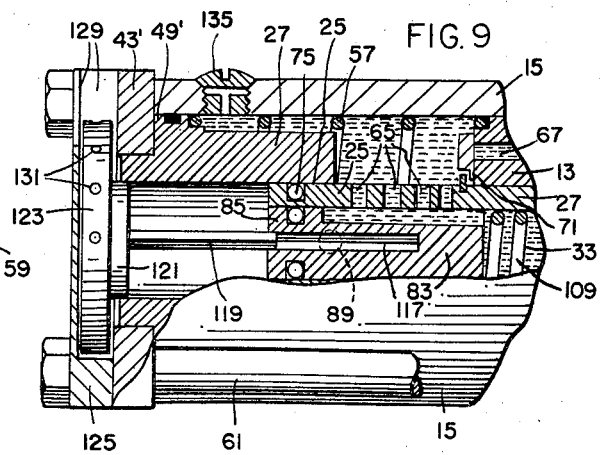
FIG. 9 is a sectional view showing a modified arrangement of the left-hand end portions of the device shown in FIG. 1.

If desired, as shown in FIGS. 9 and 10, the flow adjusting plug valve 83 may be formed with an axial channel 117 of non-circular, preferably hexagonal, sectional shape, opening upon the head 85, as at its center, and the plug may be adjustably turned by means of a spline stem 119 extending in and shaped sectionally to slidingly fit the channel 117, said stem extending outwardly of the head 85 and being secured fast into the hub 121 of a capstan wheel 123. The capstan wheel 123 may overlie the outerface of the end plate 43′, with the hub 121 extending within and turnably journalled in the outer end of the journal 27. The capstan wheel 123 may be enclosed by a cover plate 125 of preferably square configuration and size matching the end plate 43′. the cover plate 125 being secured by the bolts 61, in position overlying the end plate 43′ and having a circular cavity 127 formed centrally in its underside to turnably receive the capstan wheel in the cavity. The cover plate 125 may be cut away, on one side, to provide an opening 129 through which a portion of the end plate 43′ and of the capstan wheel 125 may be viewed, and through which capstan rods or pins may be applied into the circumferentially opening ends of radial sockets 131 formed in peripherally spaced relation in the rim portions of the capstan wheel to permit the same to be turned in adjusting the valve plug 83. Index and gauge marks 113′ and 115′ for indicating the adjusted position of the valve means may be applied on the capstan wheel and end plate portions exposed in the opening 129.

In order to charge the cylinder 15 with hydraulic fluid, under pressure, an inlet fitting 133 embodying a check valve permitting fluid flow in one direction only, through the fitting into the cylinder, may be mounted in a threaded opening formed in the cylinder 15, preferably opposite the inner end 53 of the sleeve member 47. A bleed cock 135 may also be mounted in a threaded opening formed in the cylinder 15 and disposed preferably immediately inwardly of the peripheral flange 49′ of the support bushing 27. The bleed cock may conveniently comprise a set screw having a head, formed with an inwardly facing conical portion, adapted to sealingly engage a conical seat, formed in the outer wall of the cylinder 15, at the outer end of the threaded opening in which the cock is mounted. Inwardly of its conical portion, the set screw may be provided with a diametral duct, opening at its opposite sides, and the set screw may also be formed with an axial duct, connected with the diametral duct and opening at the inner end of the set screw. By backing the set screw away from engagement in its conical seat, the opposite ends of the diametral duct may be exposed outwardly of the cylinder 15, thereby permitting hydraulic fluid to bleed from the cylinder. By setting the screw tightly against its conical seat, the cylinder may be tightly sealed against the escape of fluid at the bleed cock.

A ring 121 of resilient, compressible, closed cell material may be assembled within the cylinder 15 in position surrounding the inner portions of the sleeve member 47 adjacent and inwardly of its peripheral flange 49. The cellular ring 121 is sized to normally occupy the entire space between the ring encircled portions of the sleeve member and the surrounding portions of the cylinder. The ring, however, may be compressed against the peripheral flange 49, in order to accommodate any excess quantity of hydraulic fluid that may be charged into the cylinder. In this connection, the cells of the ring 121 are of closed character, so that the ring material will not absorb or soak up fluid, but will yield axially in the direction of the flange 49 in the event that excess fluid is delivered into the cylinder, under pressure.

Fluid may be charged into the cylinder 15, through the inlet fitting 133, by removing its cover and attaching a conventional supply hose connected with any suitable external source of fluid under pressure, while the bleed cock 135 is open. When bing charged, the buffering device is preferably supported with its distal end in elevated position so that the bleed cock will initially pass air from the cylinder, and will leak oil only when the housing has become fully charged. The piston rod 23 also should be pushed a short distance into the cylinder to uncover the inner end 53 of the sleeve member 47 against the influence of the spring 57, thereby exposing the piston rod 21 to the inlet fitting 133 and allowing oil to flow into the space within the sleeve member 47, inwardly of the seal means 56, and also into the piston rod channel 33, through the ducts 35, and thence outwardly into the cylinder 15, through the ports 65, the valve member 81, preferably, being then adjusted to its wide-open port position.

As soon as oil commences to bleed through the cock 135, it may be screwed down upon its seal to close off fluid leakage. Excess fluid may then be delivered into the housing to compress the closed cell ring 121 to a desired extent, thereby filling the inner end of the space, around the sleeve member 47, with excess oil. The compression of the air or gas, which fills the cells of the ring, serves to maintain substantially constant fluid pressure in the oil with which the cylinder 15 has been charged. The ring 121 thus maintains the pressure of fluid in the cylinder at a desired level despite leakage, so long as any excess fluid remains in the space surrounding the inner portions of the sleeve member 47.

It is thought that the invention and its numerous attendant advantages will be fully understood from the foregoing description, and it is obvious that numerous changes may be made in the form, construction and arrangement of the several parts without departing from the spirit of the invention, or sacrificing any of its attendant advantages, the form herein disclosed being a preferred embodiment for the purpose of illustrating the invention.

The invention is hereby claimed as follows:

1. A cushioning device comprising a support frame forming an hydraulic fluid containing cylinder having heads at its opposite ends, a piston movable axially in the cylinder, a piston rod carrying said piston within the cylinder, the piston rod extending outwardly of the cylinder, at its proximal end, for connection with a movable object to be cushioned, stop means for limiting movement of said piston toward the proximal end of said cylinder including a sleeve extending axially thereof around said piston rod in spaced relation thereto, said piston rod having an axial channel opening, through a duct, into the cylinder on the said of the piston facing the proximal end of the rod and into the space between said piston rod and sleeve, said piston rod having a plurality of axially spaced outlet ports disposed between the piston and the distal end of the rod in position to connect the cylinder with the channel, on the side of the piston remote from the proximal end of the rod, and means in sliding contact with the surface of said piston rod for successively closing said ports as the piston is moved toward the distal end of the cylinder from a retracted position adjacent its proximal end.

2. A cushioning device, as set forth in claim 1, including valve means associated with the piston and operable to permit free fluid flow from the cylinder, on the side of the piston which faces the proximal end of the shaft, into the cylinder on the opposite side of the piston, whenever the piston moves toward its retracted position, said valve means preventing fluid flow, during piston movement toward the distal end of the cylinder.

3. A cushioning device, as set forth in claim 1, wherein the piston comprises a disc secured firmly on the rod between said ports and said duct, the disc having a fluid flow duct opening upon the opposite sides of the disc, and a movable valve member in position to cover and uncover the end of the fluid flow duct which opens on the side of the disc facing the distal end of the rod.

4. A cushioning device, as set forth in claim 1, including manually adjustable means for controlling the rate of fluid flow through the outlet ports, into the axial channel of the piston rod.

5. A cushioning device, as set forth in claim 1, including a fluid flow control member adjustably shiftable in the axial channel of the piston rod, opposite said ports, in position to close off the same to any desired extent, between fully open and substantially closed positions.

6. A cushioning device, as set forth in claim 5, wherein the fluid flow control member comprises a cylindrical plug, sized for snug assembly in the channel of the piston rod and turnable therein opposite the outlet ports, said plug having a lateral groove opening into the channel, at an end of the plug, and a port closing land, adjacent said groove and terminating in a longitudinal lip defining one side of the groove, so that the ports may open entirely into the groove, when the flow control member is in port open condition, and the plug may be turnably adjusted to advance the lip into the ports to a desired extent to cause the land to cover and thus block the ports.

7. A cushioning device, as set forth in claim 6, wherein the land is formed with a notch in registration with a said port, said notch extending at said lip and inwardly thereof, to allow minimal fluid flow through the port when said lip covers the port.

8. A cushioning device, as set forth in claim 7, wherein the depth of the notch diminishes away from the lip.

9. A cushioning device, as set forth in claim 7, wherein the plug has an outstanding pin extending in a circumferential slot formed in the rod, to limit the turning movement of the plug in the channel, the side of the slot adjacent the distal end of the rod being serrated to receive the pin in any one of a number of angularly adjusted positions of the plug in the channel and biasing means normally urging the plug in the channel in a direction to yieldingly seat the pin upon the serrated side of the slot.

10. A cushioning device, as set forth in claim 1, wherein said last named means includes an axial support bushing for receiving the distal end of the rod.

11. A cushioning device, as set forth in claim 2, wherein the support bushing opens through the cylinder head, at the distal end of the cylinder, to reveal the distal end of the rod, said piston rod channel opening at the distal end of the rod, a fluid flow control member comprising a cylindrical valve plug extending turnably within the channel and having a head exposed at the distal end of the piston rod, to facilitate angular adjustment of the valve plug in the channel.

12. A cushioning device, as set forth in claim 11, including cooperating index and gauge marks on the head and on the distal end of the rod, around said head to visually indicate the adjusted position of the plug in the channel.

13. A cushioning device, as set forth in claim 12, wherein the head of the valve plug is formed with a noncircular cavity for engagement with a manually operable plug turning tool, said cavity being accessible through the open end of the support bushing, at the distal end of the cylinder.

14. A cushioning device, as set forth in claim 12, wherein the valve plug is formed for sliding engagement with a spline pin which extends outwardly of the head of the plug, an adjusting wheel fastened on the spline pin and turnably supported on the cylinder head at the outer end of the support bushing, so that the valve plug may be adjustably turned, in the piston rod channel, in response to adjustment of the wheel on the cylinder head.

15. A cushioning device, as set forth in claim 14, including cooperating gauge and index marks on the edge of the wheel and on wheel edge adjacent portions of the cylinder head for visually showing the adjusted position of the valve plug in the channel of the piston rod.

16. A cushioning device comprising a support frame forming an hydraulic fluid containing cylinder having heads at its opposite ends, a piston movable axially in the cylinder, means yieldingly biasing the piston in the cylinder toward a retracted position inwardly of and adjacent one of said heads, stop means for limiting biased piston movement in said retracted position, fluid pressure maintaining means comprising a compressible body of closed cellular non-absorbent material mounted in the cylinder, in the space between the piston, when in retracted position, and the adjacent cylinder head, and means to charge hydraulic fluid, into the cylinder, under pressure, in excess quantity sufficient to compress the body of cellular material against the head, to thereby store a quantity of excess fluid, between said body and said piston, and maintain fluid pressure despite leakage thereof.

(References on following page)

References Cited

UNITED STATES PATENTS

| | | | |
|---|---|---|---|
| 627,828 | 6/1899 | Page | 16—62 |
| 1,780,066 | 11/1930 | Wallace | 267—64 |
| 1,783,348 | 12/1930 | Taylor | 188—103 |
| 1,785,339 | 12/1930 | Daland | 267—8 |
| 1,792,695 | 2/1931 | Lewis | 188—88 |
| 1,902,421 | 3/1933 | Rawdon et al. | 267—34 |
| 2,593,372 | 4/1952 | Watts | 267—64 |

FOREIGN PATENTS 156,627  5/1954  Australia.

ARTHUR L. LA POINT, Primary Examiner

HOWARD BELTRAN, Assistant Examiner

U.S. Cl. X.R.

16—62; 188—88, 103; 213—43; 267—34, 64

PO-1050
(5/69)

UNITED STATES PATENT OFFICE
CERTIFICATE OF CORRECTION

Patent No. 3,491,993  Dated January 27, 1970

Inventor(s) Harold W. Scholin et al

It is certified that error appears in the above-identified patent and that said Letters Patent are hereby corrected as shown below:

Column 4, line 20, "uring" should read --urging--.

Column 5, line 75, "offsettng" should read --offsetting--.

Column 6, line 10, "inntensities" should read --intensities--
line 23, "conditions" should read --condition--.

Column 7, line 73, "43'." should read "43',".

Column 8, line 58, "bing" should read --being--.

Column 10, line 11, "7" should read "5".

Column 10, line 23, "2" should read "10".

SIGNED AND
SEALED
JUL 7 1970

(SEAL)
Attest:

Edward M. Fletcher, Jr.
Attesting Officer

WILLIAM E. SCHUYLER, JR.
Commissioner of Patents